(No Model.)
H. H. CUMMINGS.
SPEED CHANGING, REVERSING, AND STOPPING MECHANISM.
No. 529,715. Patented Nov. 27, 1894.
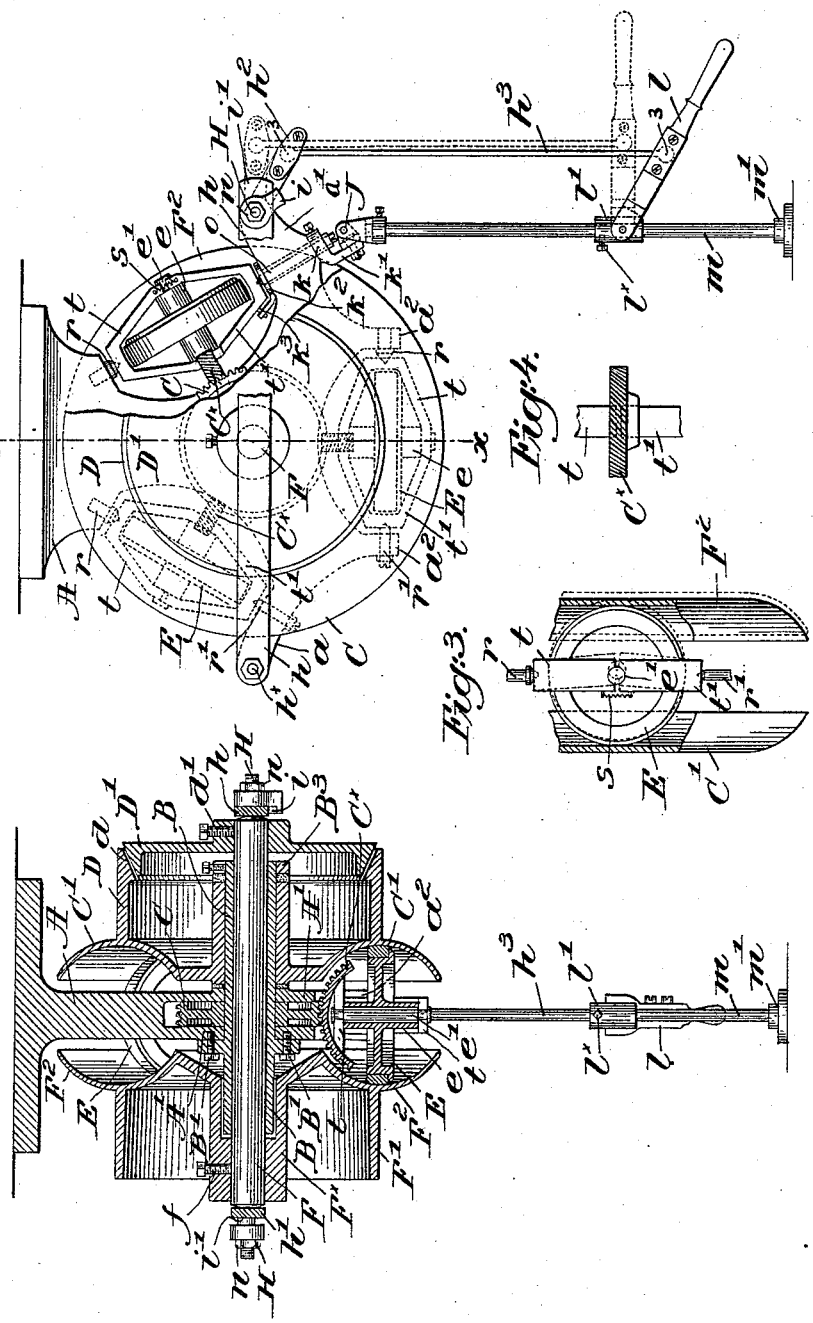
Witnesses.
Fred S. Greenleaf.
Thomas J. Drummond.
Inventor
Henry H. Cummings.
by Crosby & Gregory
attys.

UNITED STATES PATENT OFFICE.

HENRY H. CUMMINGS, OF MALDEN, MASSACHUSETTS.

SPEED-CHANGING, REVERSING, AND STOPPING MECHANISM.

SPECIFICATION forming part of Letters Patent No. 529,715, dated November 27, 1894.

Application filed June 18, 1894. Serial No. 514,906. (No model.)

*To all whom it may concern:*

Be it known that I, HENRY H. CUMMINGS, of Malden, county of Middlesex, State of Massachusetts, have invented an Improvement in Speed-Changing, Reversing, and Stopping Mechanism, of which the following description, in connection with the accompanying drawings, is a specification, like letters and figures on the drawings representing like parts.

This invention has for its object the production of a combined speed-changing, reversing and starting and stopping mechanism adapted to be applied to various machines, such as lathes, drills, planers, &c., wherein it is desired to change the speed of a shaft according to the work to be done, and also to start, reverse, or stop altogether the rotation of the shaft.

My improved mechanism is adapted to be interposed between the main shafting and the apparatus to be driven, and it comprises a construction and arrangement of parts fully described hereinafter in the specification and particularly pointed out in in the claims.—

Figure 1 in side elevation, partially broken out, represents my improved speed-changing, reversing and stopping mechanism. Fig. 2 is a vertical section taken on the line $x-x$, Fig. 1, looking toward the right. Fig. 3 is a detail view of one of the friction wheels and its support, viewed from its outer side, and Fig. 4 is a detail to be described.

Referring to the drawings, I have shown the mechanism as supported by a yoke-like main frame A suitably shaped to form bearings for the operating parts, and adapted to be secured to the ceiling or other convenient part of a building. The frame-work has a transverse opening in its bifurcated portion A', through which a sleeve B is extended and clamped in any suitable manner, as by set screws B', see Fig. 2, passing through a flange of the sleeve and into the frame. A spiral gear C, shown in section in Fig. 2, is passed between the parts A' of the frame-work before the sleeve B is inserted, the said sleeve passing through the hub of and forming a bearing for said spiral gear. A pulley D, represented as a belt pulley and adapted to receive a belt from any suitable driving or counter shaft, is mounted upon and adapted to be rotated continuously upon or about the stationary sleeve, the pulley being prevented from longitudinal movement by a collar $B^3$ secured to the sleeve. The belt pulley has connected to or forming part of it a friction pulley C', having at its face a concaved annular groove adapted to be entered by one or more shiftable friction disks or wheels E having preferably non-metallic peripheries, three of such disks being herein shown. The sleeve B receives through it and forms, a bearing for a shaft F, extended beyond the said sleeve and having secured upon it by a set screw $f$, or otherwise, a belt pulley F', loose relatively to the pulley D and adapted to receive a belt from the main or power shaft of the machine to be driven. This pulley F' also has secured to it or forming a part thereof a friction pulley $F^2$ having a concaved annularly grooved inner face to receive and co-operate with the friction disks or wheels E.

Referring to Fig. 2, it will be seen that the pulleys D and F' are located on opposite sides of the frame-work A, the hub $F^x$ of the pulley F' being cored out to admit one end of the sleeve B, thus forming an additional bearing for the pulley F', which is also longitudinally movable thereon. The outer end of the pulley D, as herein shown, has a beveled annular face $d$, adapted to co-operate at times with the similarly beveled face of a clutch member D', when said face $d$ and clutch member are relatively moved, and secured to the shaft F by a set screw as $d'$, or otherwise, to move with the pulley F', the movement of the said shaft, pulley F', and the clutch member D' being simultaneous, as herein shown. Spring arms $h$ and $h'$, secured at their rear ends to a rod $h^x$ fast in an ear $a$ of the frame-work A, bear against the ends of the shaft F, as clearly shown in Fig. 2, the front ends of said arms having extended loosely therethrough a rock-shaft H supported in a bearing in an ear $d'$ of the frame-work.

Pressure collars having suitable cam surfaces $i$ and $i'$ on their inner faces, adapted to co-operate with the arms $h$ and $h'$ respectively, are secured to the threaded ends of the rock-shaft H outside of the said arms, the cams being set at different angles, so that when one of the arms as $h'$, Figs. 1 and 2, is engaged by and pressed inward by its cam $i'$, the other arm $h$ is free to move outwardly against the collar of its cam $i$, and vice versa, the collars limiting the outward movement of said arms, and in consequence regulating the longitudinal movement of the shaft F and its attached parts, the resilience of the arms aiding the cams in moving the shaft. Suitable set nuts $n$ hold the collar in adjusted position on the rock-shaft, whereby the longitudinal movement of the shaft may be regulated. An arm $h^2$ on the said rock-shaft is connected by a link $h^3$ to a controlling handle or lever $l$, pivoted to a sleeve $l'$ adjustably secured by a set screw $l^\times$ to a shaft $m$, which shaft is rotatable in a fixed bearing $m'$, Figs. 1 and 2, secured to the floor or other suitable support.

The ends of the link $h^3$ are connected to the arm $h^2$ and to the handle by ball and socket joints 3.

The upper end of the shaft $m$ is connected by a universal joint J to a lug $k'$ of a collar $k$ secured to the projecting end of a stud or pintle $o$ having its bearing in the ear $a'$ of the frame-work, the pintle being retained in place by a collar $k^2$ secured to its inner end and resting on the frame-work, as shown in Fig. 1, said collar $k^2$ having thereon an upturned lug through which a pin $k^3$ extends. The shaft $m$ may be partially rotated by means of the controlling handle or lever $l$, such rotation causing the pintle $o$ to oscillate more or less in one or the other direction, by means of the collar $k$ and joint J, and, inasmuch as the latter is a universal joint, the bearing $m'$ may be secured to any convenient support.

As best shown in Fig. 1, the frame-work A is cut away above the ears $a$ and $a'$, and between the ears $a^2$, the cut away portions being preferably equidistant from each other, and a friction disk or wheel E and its supporting yoke, to be described, are located in each cut away portion.

The hub $e$ of each disk or wheel E is adapted to rotate freely on a stud $e'$ reduced at its ends as shown in Fig. 2, and resting in bearings formed in the adjacent ends of the two-part rocking yokes $t$ and $t'$, one-half of each bearing in each part, a spring $s$ connecting the outer arms of the two parts, as clearly shown in Figs. 1 and 3. The part $t'$ of each yoke has secured to or forming a part of its inner arm a segmental spiral toothed gear $C^\times$, shown separately in Fig. 4, in engagement with the spiral gear C, whereby all the gears $C^\times$ may be moved in unison by or through the gear C. In said Fig. 4 the adjacent ends of one side of one of the two-part rocking yokes are shown, with the attached segmental gear $C^\times$. Preferably conical ended studs $r$ are inserted in the frame-work at its base and in one of the ears $a^2$, to form bearings for the parts $t$ of the several rocking yokes, the parts $t'$ of the yokes shown in dotted lines Fig. 1, having their bearings in conical ended set screws $r'$, whereby wear may be taken up when necessary.

The bearing for the part $t'$ of the yoke, shown in full lines in Fig. 1, is the conical end of the pintle $o$, hereinbefore described, the pin $k^3$ on the collar $k^2$ entering a recess in the said part $t'$ so that the yoke and the parts carried thereby will be rocked on the bearings $r$ and $o$ by the controlling handle or lever $l$ and intermediate connections, the recess being large enough to permit slight lost motion of the pin $k^3$ therein. Each yoke is adapted to rock on its end bearings, so that the friction disks or wheels E will be parallel, or at the same angles to the shaft F, the segmental gear carried by the yoke resting on the pintle $o$ being turned with the yoke as described, rotating the spiral gear C, which communicates an equal amount of rotation, and in the same direction, to the other wheels E by their segmental gears $C^\times$. When the parts are in the position shown in the drawings, the wheels E are in contact with portions of the annular concaved faces of the friction pulleys $C'$ and $F^2$ of equal diameter, the continuously moving pulley D then driving, by frictional contact, the pulley $F'$, and thereby the machine to be operated, the said pulley $F'$ being rotated at the same speed as, but in the opposite direction to the pulley D. As the peripheries of the friction wheels E travel toward the center of rotation of the friction pulleys $C'$, the speed of the friction pulley $F^2$ and shaft F will be decreased, and vice versa. It will be understood that the pulley $F'$ will be rotated at a slower or faster speed with relation to the speed of rotation of the pulley D, according to the particular position of the wheels E in the annular grooves, or in other words, the change of position of the said wheels as to their points of contact with the friction pulleys $C'$ and $F^2$ insures the rotation of the pulley $F'$ at a faster or slower speed, as may be desired.

The pressure of the cam surface $i'$ on the spring arm $h'$ maintains the shaft F and its attached friction pulley $F^2$ in the position shown in Figs. 1 and 2, and in full lines Fig. 3, the friction of the wheels E being sufficient to rotate the said pulley and the two parts of the yokes are held in alignment thereby, against the action of the springs $s$, as shown in full lines Fig. 3. When the controlling lever $l$ is lifted into dotted line position Fig. 1, the cam $i'$ is partly withdrawn from its adjacent arm $h'$, and the cam $i$ is forced against and moves the arm $h$ inward sufficiently to cause longitudinal movement of the shaft F to the left, Fig. 2, thereby separating the friction pulleys $C'$ and $F^2$. As soon as the pressure on the friction wheels E is thus removed, the springs $s$ break or "cripple" the joint between the two parts $t$ and $t'$ of the rocking yokes which rock on their conical end bearings, as shown in dotted lines Fig. 3, so that the said wheels E are moved away bodily from contact with the grooved faces of the continuously rotating pulley D, and rotation of the friction pulley $F^2$ and its attached belt pulley F' is stopped. In actual practice such movement of the wheels E is from one-sixteenth to one-eighth of an inch.

When it is desired to rotate the shaft F and pulley F' in the reverse direction, the lever or handle $l$ is moved upward beyond the dotted line position Fig. 1, the cam $i$ acting against the arm $h$ and moving the shaft still farther to the left, until the clutch member D' is brought into engagement with the conical surface $d$ of the belt pulley D, whereby the shaft F and pulley F' are driven in the same direction and at the same speed as the continuously rotating pulley D. It will be seen that the direction of rotation of the pulley F' is controlled by the movement of the lever $l$ about its pivot, as is also the stopping of the pulley, while lateral movement of the said lever rotates the shaft $m$, and regulates the position of the contacting points of the friction wheels E with the two friction pulleys, to adjust the speed of rotation of the pulley F', so that the said handle or lever forms a common actuator for such movements. It is to be noted that the speed of said pulley may be varied when it is rotated in the opposite direction to the pulley D, but when rotated in the same direction its speed is exactly that of the continuously rotating pulley D. The springs $s$ cause the friction wheels E to bear with a yielding pressure against the pulley $F^2$, and also quickly move said wheels away from the annular groove of the pulley C' by bending the yokes, as soon as the pressure exerted by the friction pulley $F^2$ on their peripheries is relaxed, the teeth of the spiral gear C and the several segmental gears $C^x$, however, being long enough to remain in engagement when the yokes are so bent the movement of the gears $C^x$ from their original angle with relation to the spiral gear C being so slight that it can be accomplished within a limit permitted by the play between the teeth of the said gears.

The operation of the entire mechanism is controlled by the movement of the common actuator $l$, a simple movement in one or another direction starting and changing the speed, reversing the direction of rotation, or altogether stopping the machine driven thereby, without the intervention of fast and loose pulleys on the machine. A quick movement of the actuator $l$ about its pivot from one extreme position to the other instantly reverses the direction of rotation of the pulley F', and accidental lateral movement of said actuator while the clutch member D' is in engagement with the pulley D will have no effect whatever, inasmuch as the friction wheels are at such times out of contact with the annular groove in the friction pulley C'.

Prior to my invention I am not aware that a frictional speed-changing mechanism has ever had combined with it starting and stopping, or friction reversing mechanism, to start, stop, or reverse the rotation of the driving shaft of a machine as desired, and all controlled from a single point, so this invention is not limited to the exact devices shown for moving the starting and stopping, or the reversing mechanism, nor is this invention limited to the exact construction and arrangement of parts shown.

I claim—

1. A pulley adapted to be continuously rotated, a pulley to be driven, loose with relation thereto, the adjacent faces of said pulleys having annular grooves therein; a friction wheel interposed between the grooved faces of said pulleys, and a rocking support for said wheel, combined with means connected to one of said pulleys to cause positive movement thereof toward the other pulley to effect the engagement of the friction wheel and both the grooved pulley faces, to thereby rotate the loose pulley, or to positively withdraw said connected pulley from such engagement with the friction wheel to stop the rotation of the loose pulley, and a device independent of the position or of the means for actuating said pulleys, to turn the rocking support to attain the desired relative speed of the pulleys, substantially as described.

2. A pulley adapted to be continuously rotated, a pulley to be driven, loose with relation thereto, the adjacent faces of said pulleys having annular grooves therein, a rocking support, and a friction wheel mounted thereon in a yielding manner between the grooved faces of said pulleys, combined with means to cause positive relative lateral movement of the pulleys and thereby bring the friction wheel into joint engagement with the grooved faces of said pulleys, to rotate the loose one, reverse relative movement of the pulleys by said means permitting the yielding of and thereby withdrawing the friction wheel from said joint engagement and stopping the rotation of the loose pulley, substantially as described.

3. A pulley adapted to be continuously rotated, a pulley to be driven, loose with relation thereto, and axially in alignment therewith, said pulleys being relatively movable laterally and having annular grooves in their opposite adjacent faces, a rocking support having fixed bearings, and a friction wheel mounted thereon between the grooved faces of the said pulleys, combined with means to move said pulleys relatively to bring their grooved faces into engagement with opposite portions of the friction wheel, whereby the loose pulley is rotated by but oppositely to the continuously rotated pulley, a device to turn the rocking support and thereby alter the angle of the friction wheel to attain the desired relative speed of the pulleys, and a common actuator, to operate either the support turning device or the means for relatively moving the pulleys, substantially as described.

4. A pulley adapted to be continuously rotated, a pulley to be driven, loose with relation thereto, and axially in alignment therewith, the adjacent opposite faces having annular grooves therein, a series of rocking supports, a friction wheel mounted in each support and interposed between the grooved faces of the pulleys, and connections between and to rock said supports in unison, combined with means independent of either of said pulleys to actuate said connections and turn the rocking supports to attain the desired relative speed of the pulleys, and independent mechanism connected to one of said pulleys to cause positive movement thereof toward or from the other pulley, and thereby engagement or disengagement of the friction wheels and the grooved faces of the pulleys, to thereby rotate, or stop the rotation of the loose pulley, substantially as described.

5. A pulley adapted to be continuously rotated, a pulley loose with relation thereto, and to be driven in either direction, the adjacent opposite faces of said pulleys having annular grooves therein, a clutch member concentric to and rotatable with the loose pulley and adapted to be directly engaged at times with the continuously rotating pulley, to thereby rotate the loose pulley at the same speed and in the same direction, and a friction wheel interposed between the grooved faces of the pulleys, combined with means to cause relative movement of the clutch member and continuously rotated pulley, and also to cause engagement or disengagement of the friction wheel and grooved pulley faces, to thereby rotate the loose pulley oppositely the continuously rotated pulley, or to stop the said loose pulley, as desired, substantially as described.

In testimony whereof I have signed my name to this specification in the presence of two subscribing witnesses.

HENRY H. CUMMINGS.

Witnesses:
GEO. W. GREGORY,
JOHN C. EDWARDS.